（12） United States Patent
Shirai

(10) Patent No.: US 8,514,912 B2
(45) Date of Patent: Aug. 20, 2013

(54) SEARCH FREQUENCY CORRECTION METHOD, POSITIONING METHOD, PROGRAM, AND RECEIVING APPARATUS

(75) Inventor: Tsubasa Shirai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1019 days.

(21) Appl. No.: 12/478,483

(22) Filed: Jun. 4, 2009

(65) Prior Publication Data

US 2009/0310655 A1 Dec. 17, 2009

(30) Foreign Application Priority Data

Jun. 12, 2008 (JP) .................................. 2008-153908

(51) Int. Cl.
*H04B 1/00* (2006.01)
(52) U.S. Cl.
USPC ................. 375/150; 340/426.19; 340/539.13; 701/32.4; 701/412; 701/468; 324/76.33
(58) Field of Classification Search
None
See application file for complete search history.

(56) References Cited

U.S. PATENT DOCUMENTS

| 6,329,946 B1 | 12/2001 | Hirata et al. | |
| 2006/0227856 A1* | 10/2006 | Ledvina et al. | ............... 375/150 |

FOREIGN PATENT DOCUMENTS

| JP | H08-146113 A | 6/1996 |
| JP | 2000-193735 A | 7/2000 |
| JP | 2001-349935 A | 12/2001 |
| JP | 2003-037526 A | 2/2003 |
| JP | 2004-340855 A | 12/2004 |
| JP | 2007-322233 A | 12/2007 |

* cited by examiner

*Primary Examiner* — Adolf Dsouza
(74) *Attorney, Agent, or Firm* — Global IP Counselors, LLP

(57) ABSTRACT

A search frequency correction method includes: obtaining correlation values by correlating between a received signal that is modulated by direct sequence spread spectrum modulation and a replica code of a spread code with respect to I and Q components at a predetermined search frequency, obtaining accumulated correlation values by accumulating the correlation values of each polarity inversion interval with respect to the I and Q components, calculating a plurality of combinations of the accumulated correlation values in both signs, selecting one of the combinations based on the calculation results of the respective combinations, and correcting the search frequency based on a time variation of an IQ phase represented by the accumulated correlation values of the one of the combinations.

5 Claims, 10 Drawing Sheets

US 8,514,912 B2

SEARCH FREQUENCY CORRECTION METHOD, POSITIONING METHOD, PROGRAM, AND RECEIVING APPARATUS

Japanese Patent Application No. 2008-153908 filed on Jun. 12, 2008, is hereby incorporated by reference in its entirety.

BACKGROUND

1. Technical Field

The present invention relates to a search frequency correction method, a positioning method, a program, and a receiving apparatus.

2. Related Art

As a type of a receiving apparatus adapted to receive a signal modulated by a direct sequence spread spectrum method, there exists a positioning apparatus receiving a positioning signal spread-modulated with a pseudo random noise (PRN) code to perform positioning. For example, Global Positioning System (GPS) positioning apparatuses receiving GPS satellite signals transmitted from GPS satellites to perform positioning are well known to the public.

In order for capturing the positioning signal out of the received signals, it is required to execute correlation calculation between the received signals and the replica code of the spread code at a predetermined search frequency while shifting the phase of the replica code, and extract the phase (a so-called code phase) with which the correlation value becomes the maximum. However, since the capturing of the positioning signal results in failure unless the search frequency is set appropriately, various technologies for determining the search frequency have been invented (e.g., JP-A-8-146113 (Document 1)).

In the technology disclosed in the Document 1, the search frequencies different from each other are set in respective satellites taking the Doppler frequency caused by the variation in the relative position between the positioning satellite and the positioning apparatus and the oscillation frequency of the clock incorporated in the positioning apparatus into consideration, thereby attempting to capture the satellite. Further, according to the technology, when capturing of one satellite is successful, the search frequencies of other satellites are variably set based on the offset of the oscillation frequency of the clock having been set for the capturing. In the technology, in order for adjusting the search frequencies, it is required to capture at least either one of the satellites. Further, since the variation in the relative position to the positioning apparatus is different between the positioning satellites, there is also caused a problem that the search frequency for one satellite thus captured is not necessarily suitable for the search frequencies for other satellites.

SUMMARY

An advantage of some aspects of the invention is to propose a novel method for obtaining the search frequencies with high accuracy.

A search frequency correction method according to a first aspect of the invention includes: executing correlation calculation between a received signal of a signal modulated by a direct sequence spread spectrum method and a replica code of a spread code with respect to each of I and Q components at a predetermined search frequency, calculating accumulated correlation values by accumulating respective correlation values of the I and Q components, which are obtained by the correlation calculation, each polarity inversion interval, calculating the accumulated correlation values in each polarity inversion interval with a plurality of combinations of different signs with respect to each of the I and Q components, selecting one of the combinations based on results of the calculation of the respective combinations, and correcting the search frequency based on a time variation of an IQ phase represented by the accumulated correlation values of the one of the combinations.

Further, as another aspect of the invention, it is possible to configure a receiving apparatus including a correlation calculation section adapted to execute correlation calculation between a received signal of a signal modulated by a direct sequence spread spectrum method and a replica code of a spread code with respect to each of I and Q components at a predetermined search frequency, an accumulation section adapted to calculate accumulated correlation values by accumulating respective correlation values of the I and Q components, which are obtained in the correlation calculation, at each polarity inversion interval, a calculation section adapted to calculate the accumulated correlation values of each polarity inversion interval in a plurality of combinations of different signs with respect to each of the I and Q components, a selection section adapted to select one of the combinations based on results of the calculation of the respective combinations, and a correction section adapted to correct the search frequency based on a time variation of an IQ phase represented by the accumulated correlation values of the one of the combinations.

According to the first aspect and another aspect of the invention, the correlation calculation between the received signal of the signal modulated by the direct sequence spread spectrum method and the replica code of the spread code is executed with respect to each of the I and Q components at a predetermined search frequency. Then, the correlation values of the respective I and Q components obtained by the correlation calculation are accumulated in each polarity inversion interval to calculate the accumulated correlation values, and the accumulated correlation values of the respective polarity inversion intervals are calculated in a plurality of combinations of positive and negative signs with respect to each of the I and Q components. Then, one of the combinations is selected based on the result of the calculation of each of the combinations, and the search frequency is corrected based on the time variation of the IQ phase as the phase of the IQ vector in the IQ coordinate system, represented by the accumulated correlation values of the one of the combinations.

The polarity of the spread code of the received signal has a possibility of being inverted each polarity inversion interval. Therefore, when calculating the plurality of accumulated correlation values obtained at each polarity inversion, the calculation is executed in a plurality of combinations with signs different from each other. Further, the combination with the minimum setoff of the accumulated correlation values due to the polarity inversion of the spread code, for example, is selected. By correcting the search frequency based on the time variation of the IQ phase of the IQ vector represented by the accumulated correlation values of the combination thus selected, it becomes possible to obtain the search frequency with high accuracy.

Further, as a second aspect of the invention, it is possible to configure the search frequency correction method according to the first aspect of the invention, wherein the step (d) includes selecting one of the combinations based on magnitude of IQ vectors represented by the accumulated correlation values of the respective combinations.

According to the second aspect of the invention, one of the combinations is selected based on the amplitude of the IQ vectors represented by the accumulated correlation values of the respective combinations obtained by calculating the accumulated correlation values in the respective polarity inversion intervals while changing the signs. For example, it is preferable to select the combination with the maximum amplitude of the IQ vector.

Further, as a third aspect of the invention, it is possible to configure the search frequency correction method according to the first or the second aspect of the invention, wherein the step (e) includes calculating an error of the search frequency based on the time variation of the IQ phase represented by the accumulated correlation values of the one of the combinations to correct the search frequency.

According to the third aspect of the invention, the error of the search frequency is calculated based on the time variation of the IQ phase represented by the accumulated correlation values of the selected one of the combinations is calculated to correct the search frequency. By correcting the search frequency using the error of the search frequency calculated from the time variation of the IQ phase, it is possible to realize the correlation calculation using an appropriate search frequency.

Further, as a fourth aspect of the invention, it is possible to configure the search frequency correction method according to any one of the first through the third aspects of the invention, wherein the step (a) is executed with a plurality of frequencies, and further including the steps of (f) accumulating the accumulated correlation values obtained with respect to the respective frequencies during a time period longer than a polarity inversion interval, (g) determining a suitable-for-search frequency based on the long period accumulated value obtained in step (f), and (h) correcting the search frequency using the suitable-for-search frequency.

According to the fourth aspect of the invention, the correlation calculation is executed at a plurality of frequencies, and the accumulated correlation values obtained for each of the frequencies are accumulated during a time period longer than a polarity inversion interval. Then, the suitable-for-search frequency is determined based on the long period accumulated values thus obtained, and the search frequency is corrected using the suitable-for-search frequency. For example, the frequency corresponding to the long period accumulated value with the largest value among the long period accumulated values obtained for the respective frequencies is determined as the suitable-for-search frequency. Further, by correcting the search frequency so as to come closer to the suitable-for-search frequency, a suitable search frequency can be obtained.

Further, as a fifth aspect of the invention, it is possible to configure the search frequency correction method according to the fourth aspect of the invention, wherein the step (h) is executed when the suitable-for-search frequency and the search frequency fail to satisfy a predetermined approximation condition.

According to the fifth aspect of the invention, the search frequency is corrected using the suitable-for-search frequency in the case in which the difference between the suitable-for-search frequency and the search frequency exceeds a certain level, for example.

Further, as a sixth aspect of the invention, it is possible to configure a positioning method including the steps of (i) executing the search frequency correction method according to any one of the first through fifth aspects of the invention using a signal, which is obtained by receiving a positioning signal modulated by a direct sequence spread spectrum method, as the received signal, and (j) performing positioning by executing predetermined positioning calculation using the accumulated correlation values.

According to the sixth aspect of the invention, the positioning calculation is executed based on the result of the correlation calculation executed at the search frequency appropriately corrected by the search frequency correction method of any one of the aspects of the invention described above, thereby realizing the positioning with high accuracy.

Further, as a seventh aspect of the invention, it is possible to configure a program for allowing the computer controlling a receiving apparatus adapted to receive a signal modulated by a direct sequence spread spectrum method to execute the search frequency correction method of any one of the first through the fifth aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an example of a preferred embodiment of the invention will be described with reference to the accompanying drawings. It should be noted that although the case in which the GPS is used as the positioning system will hereinafter be explained while exemplifying a portable phone as electronic equipment provided with a positioning apparatus, which is a type of a receiving apparatus adapted to receive a positioning signal modified by a direct sequence spread spectrum method, the embodiment to which the invention is applicable is not limited thereto.

1. Functional Configuration

Figure 1:
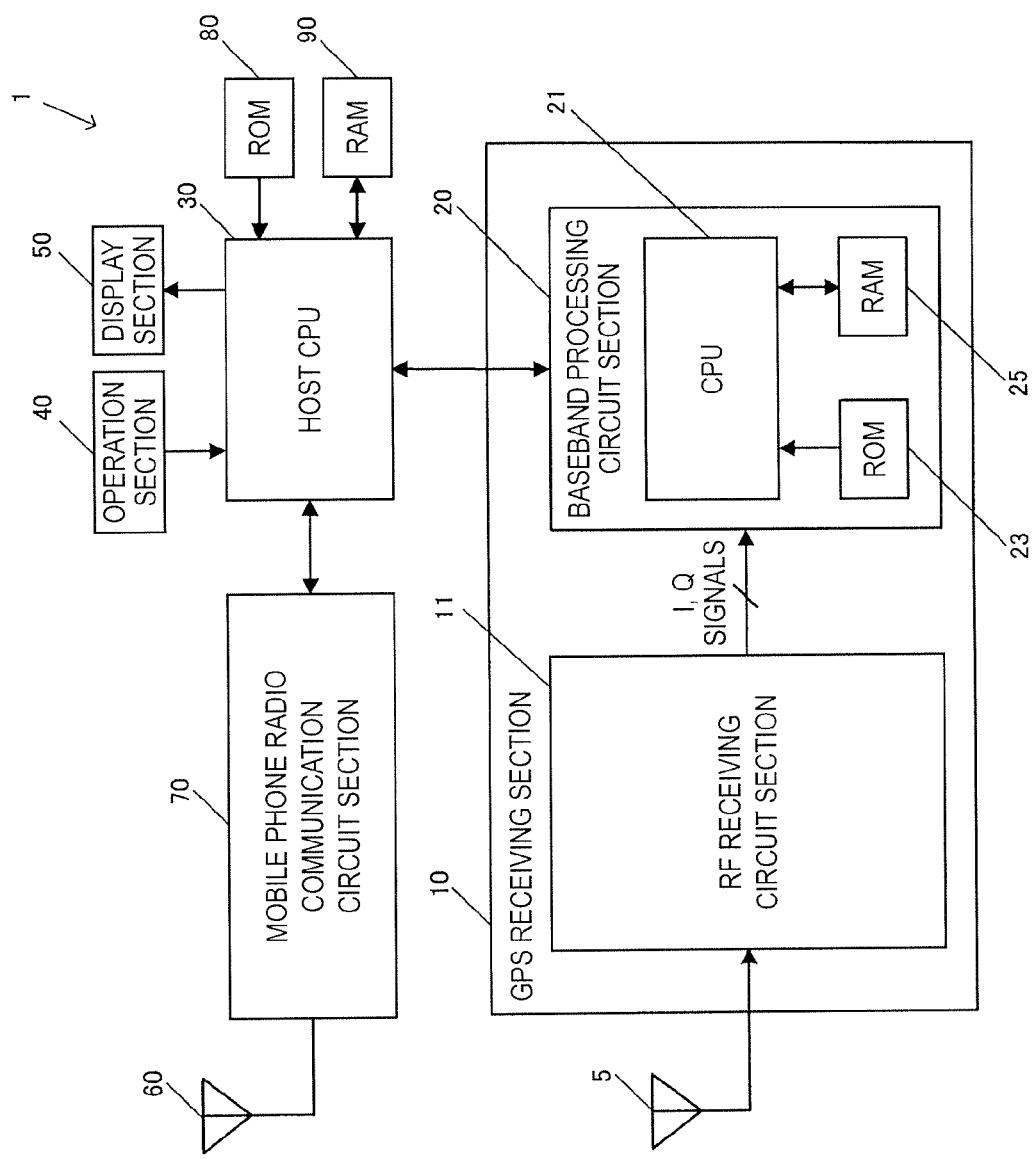
FIG. 1 is a block diagram showing a functional configuration of a portable phone.

FIG. 1 is a block diagram showing a functional configuration of the portable phone 1 in the present embodiment. The portable phone 1 is configured including a GPS antenna 5, a GPS receiving section 10, a host central processing unit (CPU) 30, an operation section 40, a display section 50, a mobile phone antenna 60, a mobile phone radio communication circuit section 70, a read only memory (ROM) 80, and a random access memory (RAM) 90.

The GPS antenna 5 is an antenna for receiving radio frequency (RF) signals including the GPS satellite signals transmitted from GPS satellites, and outputs the signals, thus received, to the GPS receiving section 10. It should be noted that the GPS satellite signal is a communication signal of 1.57542 [GHz] modulated by the direct sequence spread spectrum method with the pseudo random noise (PRN) code, which is a type of spread code different between the satellites. The PRN code is a pseudo random noise code having a code length of 1023 chips as 1 PN frame and a repetition period of 1 ms.

The GPS receiving section 10 is a positioning circuit for positioning the present location of the portable phone 1 based on the signal output from the GPS antenna 5, and is a functional block corresponding to a so-called GPS receiver. The GPS receiving section 10 is configured including an RF receiving circuit section 11, and a baseband processing circuit section 20. It should be noted that the RF receiving circuit section 11 and the baseband processing circuit section 20 can be manufactured separately as discrete large scale integration circuits (LSI), or manufactured integrally as one chip.

The RF receiving circuit section 11 is a processing circuit block for RF signals, and for dividing or multiplying a predetermined locally-oscillated signal, thereby generating the oscillation signal for RF signal multiplication. Further, the RF receiving circuit section 11 multiplies the RF signal output from the GPS antenna 5 by the oscillation signal thus generated, thereby down-converting the RF signal into a signal (hereinafter referred to as an "intermediate frequency (IF) signal") with an intermediate frequency, then amplifies the IF signal, then converts it into a digital signal with an A/D converter to output the digital signal to the baseband processing circuit section 20.

In other words, the RF receiving circuit section 11 is a receiving system for performing signal receiving by a so-called superheterodyne method. Further, although the detailed circuit configuration is not shown in the drawings, the RF receiving circuit section 11 multiplies the oscillation signal and a signal having a phase 90 degrees shifted from the oscillation signal by the RF signal, thereby obtaining the IF signal separated into an inphase component (I component) signal and a quadrature component (Q component) signal (I signal and Q signal). Further, the RF receiving circuit section 11 executes the A/D conversion on each of the I component and the Q component, and then outputs the result to the baseband processing circuit section 20.

The baseband processing circuit section 20 is a circuit section for executing correlation process or the like on the signal output from the RF receiving circuit section 11 to capture and extract the GPS satellite signal, and then decoding the data to retrieve a navigation message, time information, and so on, thereby performing the positioning calculation. The baseband processing circuit section 20 is configured including a CPU 21 as a processor, and a ROM 23 and a RAM 25 as memory devices.

The host CPU 30 is a processor for integrally controlling each of the sections of the portable phone 1 along various kinds of programs such as a system program stored in the ROM 80. The host CPU 30 displays the navigation screen with the output locations input from the CPU 21 plotted thereon on the display section 50.

The operation section 40 is an input device composed, for example, of a touch panel and button switches, and outputs to the host CPU 30 the signals corresponding to the icons and buttons held down. By operating the operation section 40, various kinds of instruction inputs such as a call request, transmission or reception request of an electronic mail, and an activation request of GPS are executed.

The display section 50 is a display device composed of a liquid crystal display (LCD) or the like, and executing various kinds of display based on the display signal input from the host CPU 30. On the display section 50, the navigation screen, the time information, and so on are displayed.

The mobile phone antenna 60 is an antenna for performing transmission and reception of the mobile phone radio communication signal and various data with the wireless base stations installed by the communication service company of the portable phone 1.

The mobile phone radio communication circuit section 70 is a communication circuit section of the mobile phone mainly composed of an RF conversion circuit, a baseband processing circuit, and so on, and executes modulation and demodulation on the mobile phone radio signal, thereby realizing phone calls, transmission and reception of the electronic mails, and so on.

The ROM 80 is a read only nonvolatile storage device, and stores a system program for the host CPU 30 to control the portable phone 1, various programs and data for the host CPU 30 to realize a navigation function, and so on.

The RAM 90 is a readable/writable volatile memory, and forms a work area for temporarily storing the system program, and various kinds of processing programs executed by the host CPU 30, and in-process data and process results of the various kinds of processes.

2. Data Configuration

Figure 2:
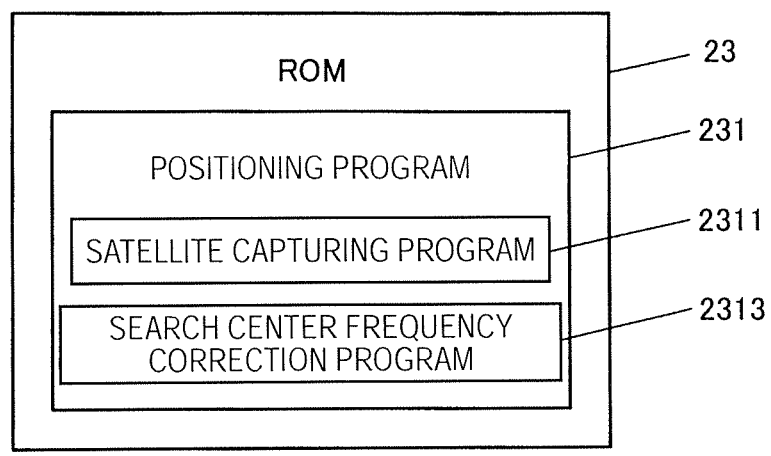
FIG. 2 is a diagram showing an example of data stored in a ROM of a baseband processing circuit section.

FIG. 2 is a diagram showing an example of the data stored in the ROM 23 in the baseband processing circuit section 20. The ROM 23 stores a positioning program 231 retrieved by the CPU 21 and executed as the positioning process (see FIG. 6). Further, the positioning program 231 includes subroutines of a satellite capturing program 2311 executed as a satellite capturing process (see FIG. 7) and a search center frequency correction program 2313 executed as a search center frequency correction process (see FIGS. 8 and 9).

The positioning process denotes a process in which the CPU 21 executes the satellite capturing process for each of the GPS satellites (hereinafter referred to as "capturing object satellites") to be the capturing objects to determine the phase (a so-called code phase) of the PRN code in the received signal, and then executes a predetermined positioning calculation using the pseudo distance obtained based on the code phase, thereby positioning the location of the portable phone 1.

The satellite capturing process denotes a process in which the CPU 21 executes correlation calculation with the replica code of the PRN code on each of the I and Q signals output from the RF receiving circuit section 21, and then accumulates the correlation values (hereinafter, the correlation value of the I signal is referred to as an "I-phase correlation value," the correlation value of the Q signal is referred to as a "Q-phase correlation value," and these correlation values are inclusively referred to as "I and Q correlation values") obtained as the result of the correlation calculation, thereby calculating accumulated correlation values (hereinafter, the accumulated correlation value of the I signal is referred to as an "I-phase accumulated correlation value," the correlation value of the Q signal is referred to as a "Q-phase accumulated correlation value," and these accumulated correlation values are inclusively referred to as "I and Q accumulated correlation values") of the I and Q signals.

The correlation calculation between the I and Q signal and the replica code is executed while modifying the frequency of the replica code generation signal within a frequency search range set based on the search center frequency, and while modifying the phase of the replica code within a predetermined phase search range. Further, the CPU 21 detects peak values with which the I and Q accumulated correlation values become the maximum for every interval of the polarity inversion of the I and Q signals, and then determines the phases of the replica code corresponding to the peak values, thereby obtaining the code phase.

The navigation data (the navigation message) overlapped on the GPS satellite signal has a possibility of inverting the bit every "20 milliseconds," and the polarity of the PRN code in the received signal is inverted in accordance with the inversion of the bit. The interval of the polarity inversion denotes the interval of the "20 milliseconds" described above. Further, in the present embodiment, a contiguous term of every interval of the polarity inversion is referred to as a "unit term."

The search center frequency correction process is a process in which the CPU 21 corrects the search center frequency as the frequency to be the center of the frequency search range. The search center frequency is a type of a search frequency. Although the detail will be described later, the CPU 21 uses the I and Q accumulated correlation values in the latest unit term and the I and Q accumulated correlation values in the unit term previous to the latest to calculate the error of the search center frequency in the latest unit term, and then corrects the search center frequency using the error. These processes will be described later in detail.

Figure 3:
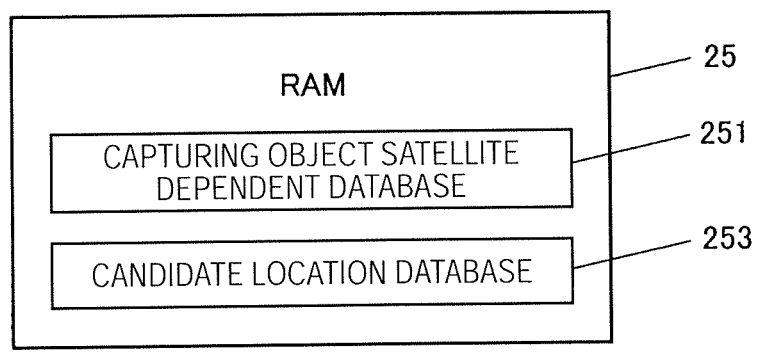
FIG. 3 is a diagram showing an example of data to be stored in a RAM of the baseband processing circuit section.

FIG. 3 is a diagram showing an example of the data to be stored in the RAM 25 in the baseband processing circuit section 20. The RAM 25 stores a capturing object satellite dependent database 251 and a candidate location database 253.

Figure 4:
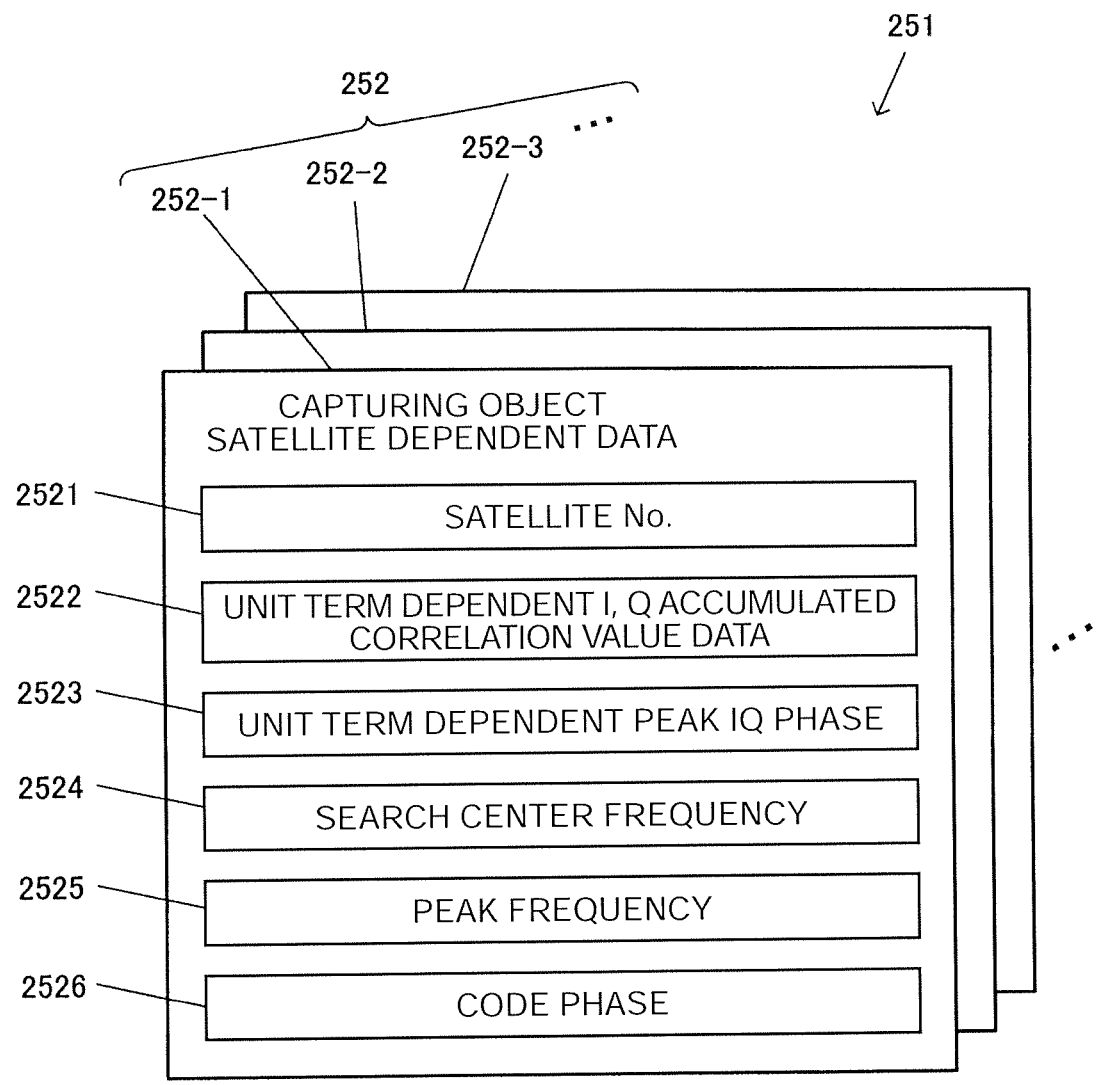
FIG. 4 is a diagram showing an example of a data configuration of a capturing object satellite dependent database.

FIG. 4 is a diagram showing an example of a data configuration of the capturing object satellite dependent database 251. The capturing object satellite dependent database 251 stores capturing object satellite dependent data 252 (252-1, 252-2, 252-3, . . . ) separately for respective capturing object satellites. Further, each of the capturing object satellite dependent data 252 stores a capturing object satellite number 2521, unit term dependent I and Q accumulated correlation value data 2522, a unit term dependent peak IQ phase 2523, the search center frequency 2524, peak frequencies 2525, and code phases 2526.

Figure 5:
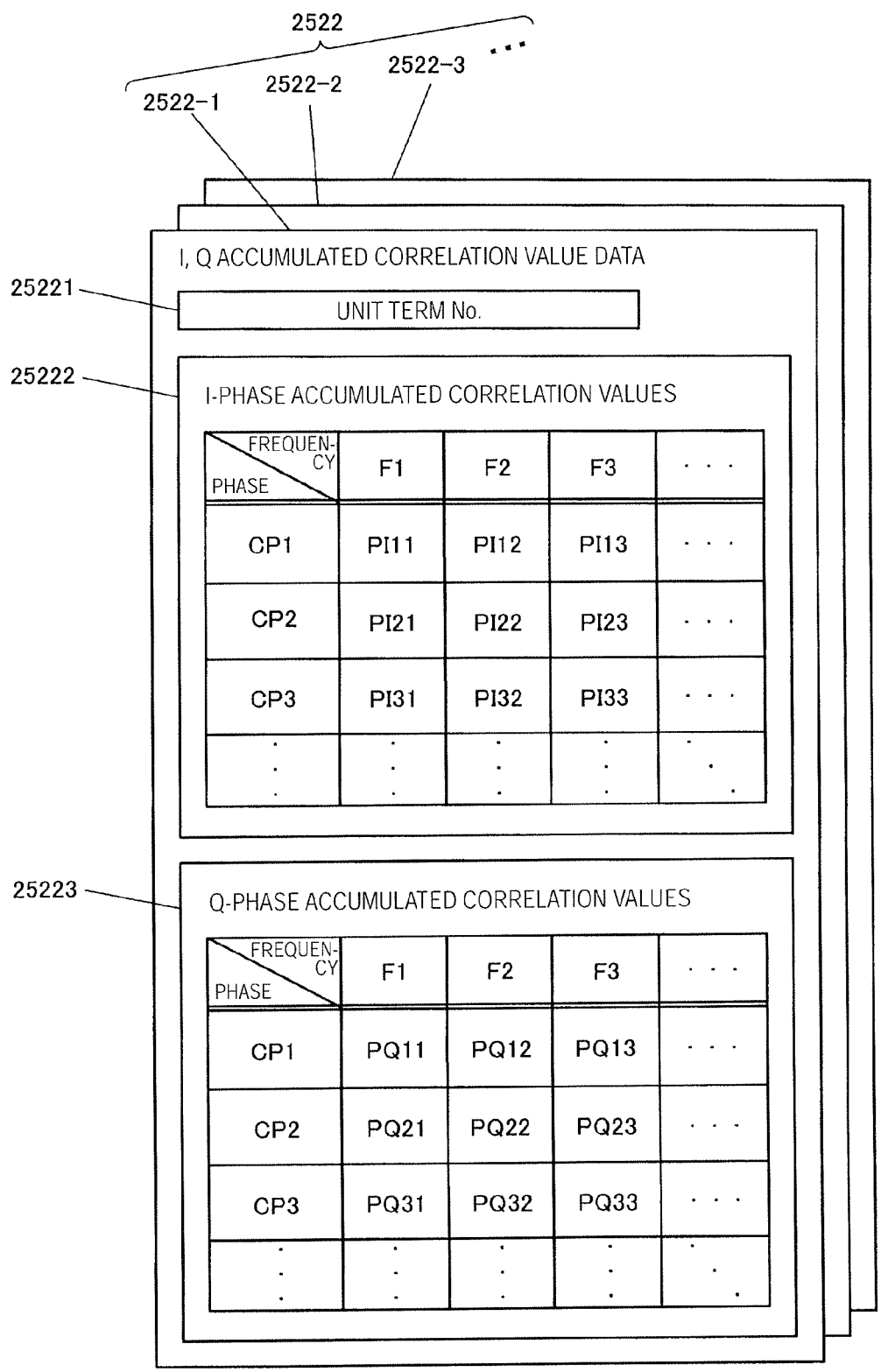
FIG. 5 is a diagram showing an example of a data configuration of unit term dependent I and Q accumulated correlation value data.

FIG. 5 is a diagram showing an example of a data configuration of unit term dependent I and Q accumulated correlation value data 2522. The unit term dependent I and Q accumulated correlation value data 2522 stores the I-phase accumulated correlation value 25222 and the Q-phase accumulated correlation value 25223 as I and Q correlation value data (2522-1, 2522-2, 2522-3, . . . ) so as to correspond to a unit term number 25221. The I-phase accumulated correlation value 25222 is the accumulation result with respect to the I-phase correlation value for each frequency of the replica code generation signal and each phase of the replica code. Similarly, the Q-phase accumulated correlation value 25223 is the accumulation result with respect to the Q-phase correlation value for each frequency of the replica code generation signal and each phase of the replica code.

The unit term dependent peak IQ phase 2523 accumulates and stores the phase (the IQ phase denotes an angle formed by an IQ vector, which is a vector from the origin of the IQ coordinates to the IQ values plotted thereon, and hereinafter the IQ phase of the peak values of the I and Q accumulated correlation values is referred to as a "peak IQ phase") of the peak values of the I and Q accumulated correlation values on the IQ coordinates separately for each unit term. The peak IQ phase is used for correcting the search center frequency.

The search center frequency 2524 is a frequency to be the center of the frequency search range. The search center frequency 2524 is corrected by the search center frequency correction process.

The peak frequencies 2525 are frequencies (hereinafter referred to as "peak frequencies") corresponding to the peak values of the accumulated correlation values obtained by executing an incoherent process on the I and Q accumulated correlation values corresponding to ten consecutive unit terms. The peak frequencies are the frequencies (suitable-for-search frequencies) suitable for the frequency search, and used for correcting the search center frequency.

The code phases 2526 are phases of the replica code corresponding to the peak values of the I and Q accumulated correlation values stored in the I and Q accumulated correlation value data corresponding to the latest unit term. The code phases 2526 are used for calculating the pseudo distance in the positioning calculation.

The candidate location database 253 is a database accumulating and storing the positioning locations as candidate locations, which can be obtained by executing a predetermined positioning calculation using the latest code phases obtained with respect to each of the capturing object satellites.

3. Flow of Process

Figure 6:
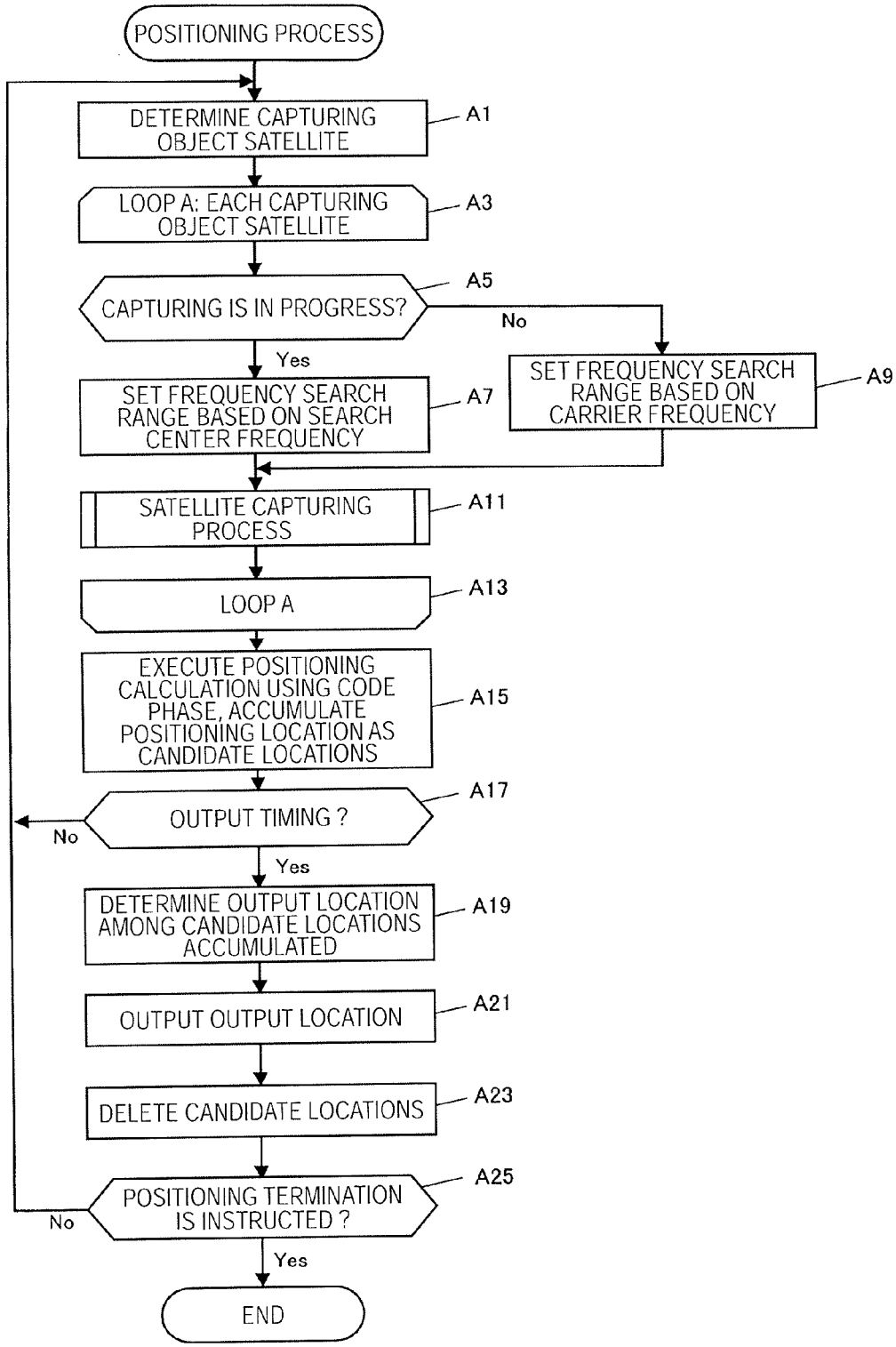
FIG. 6 is a flowchart showing the flow of a positioning process.

FIG. 6 is a flowchart showing the flow of the positioning process executed in the portable phone 1 when the CPU 21 retrieves and executes the positioning program 231 stored in the ROM 23.

The positioning process is the process the execution of which is started by the CPU 21 when the CPU 21 detects that the operation of the positioning start instruction is executed on the operation section 40 in conjunction with the reception of the GPS satellite signal by the RF receiving circuit section 11, and is the process executed in parallel to various types of processes such as execution of the various application programs. It should be noted that it is also possible to arrange that powering ON and OFF of the portable phone 1 and starting and stopping of the GPS receiving section 10 including the RF receiving circuit section 11 are respectively coupled to each other, and the execution of the process is started when the power ON operation of the portable phone 1 is detected.

Further, although not specifically explained, it is assumed that while the positioning process described below is in progress, there is created the state in which reception of the RF signal by the GPS antenna 5, and the down-conversion into the IF signal and the I-Q separation of the signal by the RF receiving circuit section 11 are executed, and the I and Q signals of the received signal are output to the baseband processing circuit section 20 as needed.

Firstly, the CPU 21 determines (step A1) the capturing object satellites based on the latest almanac data and so on. More specifically, the CPU 21 determines the GPS satellites located in the sky of the given tentative present location at the current time measured in a timepiece section, not shown, based on the data such as almanac or ephemeris. The tentative present location is given as, for example, a location of a communication base station of the mobile phone or the previous positioning location.

Subsequently, the CPU 21 executes the process of the loop A (steps A3 through A13) with respect to each of the capturing object satellites determined in the step A1. In the loop A, the CPU 21 determines (step A5) whether or not the capturing of the present capturing object satellite is in progress, and if it is determined that the capturing is in progress (Yes in the step A5), the CPU 21 looks up the capturing object satellite dependent database 251 in the RAM 25 to set (step A7) the frequency search range based on the search center frequency 2524 stored in the capturing object satellite dependent data 252 for the present capturing object satellite. Specifically, the CPU 21 sets a range centered on the search center frequency 2524 with a predetermined width as the frequency search range.

Further, in the step A5, if it is determined that the capturing of the present capturing object satellite is not in progress (No in the step A5), the CPU 21 sets (step A9) the frequency search range of the present capturing object satellite based on the carrier frequency (in greater detail, the IF frequency after the down-conversion corresponding to the carrier frequency) of the GPS satellite signal. Specifically, the CPU 21 sets a range centered on the IF frequency with a predetermined width as the frequency search range. After setting the frequency search range in the steps A7 and A9, the CPU 21 retrieves and executes a satellite capturing program 2311 stored in the ROM 23, thereby executing (step A11) the satellite capturing process.

Figure 7:
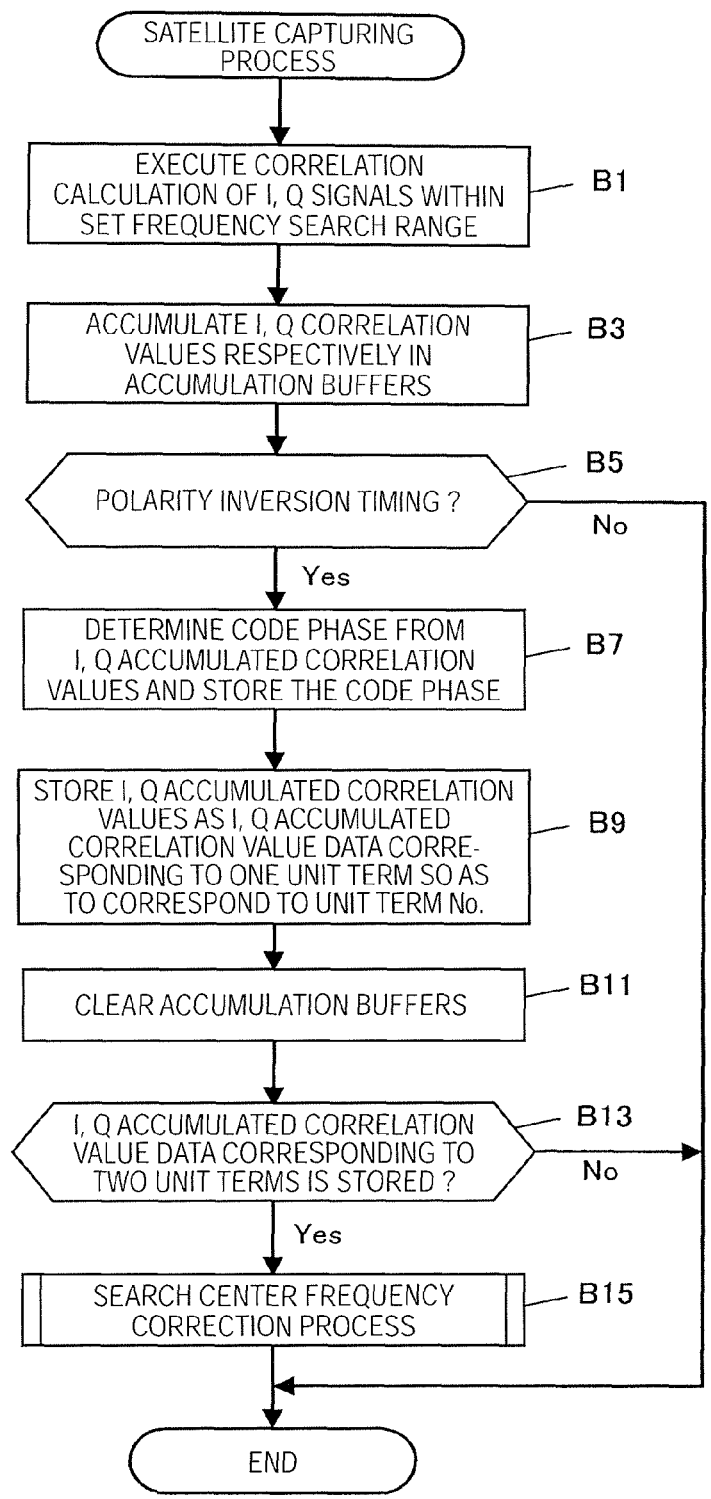
FIG. 7 is a flowchart showing the flow of a satellite capturing process.

FIG. 7 is a flowchart showing the flow of the satellite capturing process.

Firstly, the CPU 21 executes the correlation calculation between the replica code and the I and Q signals output from the RF receiving circuit section 11 while modifying the frequency of the replica code generation signal within the frequency range set in the step A7 or A9, and while shifting the phase of the replica code within a predetermined phase search range, thereby obtaining (step B1) the I and Q correlation values.

Then, the CPU 21 separately accumulates the I and Q correlation values obtained in the step B1 into respective accumulation buffers (step B3). Subsequently, the CPU 21 determines whether or not the polarity inversion of the received signal has been reached (step B5), and if it is determined that the polarity inversion has not been reached (No in the step B5), the CPU 21 terminates the satellite capturing process.

Further, if it is determined in the step B5 that the polarity inversion has been reached (Yes in the step B5), the CPU 21 determines the phases of the replica code corresponding to the peak values of the I and Q accumulated correlation values stored in the accumulation buffers as the code phases 2526, and then stores (step B7) them in the capturing object satellite dependent data 252.

Subsequently, the CPU 21 stores (step B9) the I and Q accumulated correlation values, which are stored in the accumulation buffers, into the unit term dependent I and Q accumulated correlation value data 2522 as the I and Q accumulated correlation value data corresponding to one unit term so as to correspond to the number 2521 of the unit term. Then the CPU 21 clears (step B11) the accumulation buffers.

Subsequently, the CPU 21 looks up the unit term dependent I and Q accumulated correlation value data 2522 to determine whether or not the I and Q accumulated correlation value data corresponding to two unit terms has been accumulated (step B13). Then, if it is determined that it has not been accumulated (No in the step B13), the CPU 21 terminates the satellite capturing process. Further, if it is determined that it has been accumulated (Yes in the step B13), the CPU 21 retrieves and executes the search center frequency correction program 2313 stored in the ROM 23, thereby executing (step B15) the search center frequency correction process, and then terminates the satellite capturing process.

Figure 8:
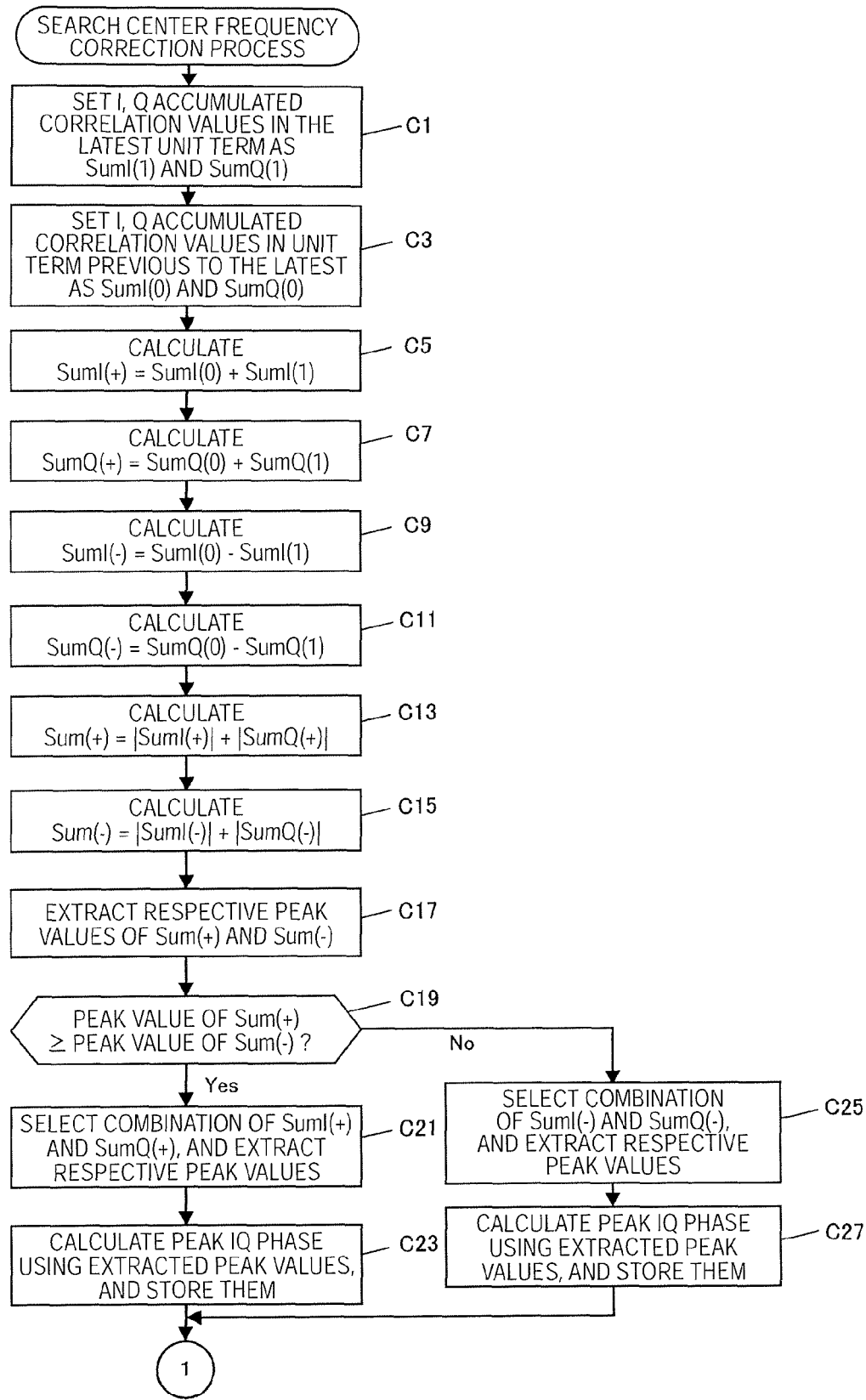
FIG. 8 is a flowchart showing the flow of a search center frequency correction process.
Figure 9:
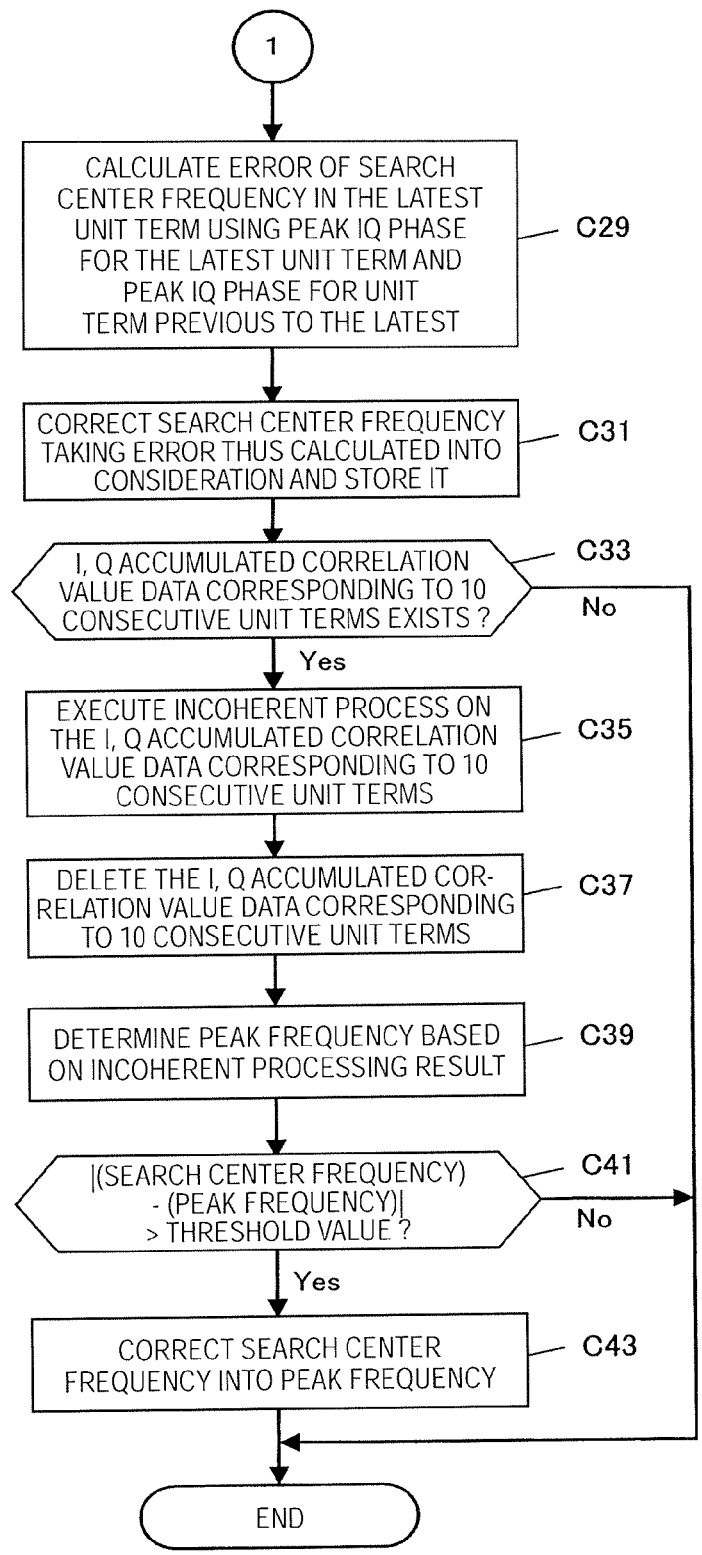
FIG. 9 is a flowchart showing the flow of the search center frequency correction process.

FIGS. 8 and 9 are flowcharts showing the flow of the search center frequency correction process.

Firstly, the CPU 21 looks up the unit term dependent I and Q accumulated correlation value data 2522 of the present capturing object satellite, and sets (step C1) the I and Q accumulated correlation values stored in the I and Q accumulated correlation value data of the latest unit term to be "SumI(1)" and "SumQ(1)," respectively. Further, the CPU 21 sets (step C3) the I and Q accumulated correlation values stored in the I and Q accumulated correlation value data of the unit term previous to the latest to be "SumI(0)" and "SumQ(0)," respectively.

Subsequently, the CPU 21 calculates the "SumI(+)" along the following formula (1) (step C5), and calculates (step C7) the "SumQ(+)" along the following formula (2).

$$\mathrm{Sum}I(+) = \mathrm{Sum}I(0) + \mathrm{Sum}I(1) \quad (1)$$

$$\mathrm{Sum}Q(+) = \mathrm{Sum}Q(0) + \mathrm{Sum}Q(1) \quad (2)$$

Further, the CPU 21 calculates the "SumI(−)" along the following formula (3) (step C9), and calculates (step C11) the "SumQ(−)" along the following formula (4).

$$\mathrm{Sum}I(-) = \mathrm{Sum}I(0) - \mathrm{Sum}I(1) \quad (3)$$

$$\mathrm{Sum}Q(-) = \mathrm{Sum}Q(0) - \mathrm{Sum}Q(1) \quad (4)$$

Subsequently, the CPU 21 calculates the "Sum(+)" along the following formula (5) (step C13), and calculates (step C15) the "Sum(−)" along the following formula (6).

$$\mathrm{Sum}(+) = |\mathrm{Sum}I(+)| + |\mathrm{Sum}Q(+)| \quad (5)$$

$$\mathrm{Sum}(-) = |\mathrm{Sum}I(-)| + |\mathrm{Sum}Q(-)| \quad (6)$$

Subsequently, the CPU 21 extracts (step C17) the respective peak values of the "Sum(+)" calculated in the step C13 and the "Sum(−)" calculated in the step C15. Specifically, the CPU 21 extracts the maximum accumulated correlation values, as the peak values, out of the "Sum(+)" and "Sum(−)" storing accumulated correlation values for the respective frequencies of the replica code generation signal and the respective phases of the replica code. The peak values correspond to the size of the IQ vector represented by the maximum accumulated correlation values in the IQ coordinates as the coordinate system of the I-phase and the Q-phase.

Subsequently, the CPU 21 determines (step C19) whether or not the peak value of the "Sum(+)" is equal to or greater than the peak value of the "Sum(−)," and if it is determined that it is equal to or greater than the peak value of the "Sum(−)" (Yes in the step C19), the CPU 21 selects the combination of the "SumI(+)" and the "SumQ(+)" to extract (step C21) the peak values "PSumI(+)" and "PSumQ(+)" thereof, respectively.

Then, the CPU 21 calculates the peak IQ phase "θ" along the following formula (7) using the peak values extracted in the step C21, and stores (step C23) it into the unit term dependent peak IQ phase 2523 so as to correspond to the number of the present unit term.

$$\theta = \tan^{-1}(P\mathrm{Sum}I(+)/P\mathrm{Sum}Q(+)) \quad (7)$$

Further, if the CPU 21 determines in the step C19 that the peak value of the "Sum(+)" is smaller than the peak value of the "Sum(−)" (No in the step C19), the CPU 21 selects the combination of the "SumI(−)" and the "SumQ(−)" to extract (step C25) the peak values "PSumI(−)" and "PSumQ(−)" thereof, respectively.

Then, the CPU 21 calculates the peak IQ phase "θ" along the following formula (8) using the peak values extracted in the step C25, and stores (step C27) it into the unit term dependent peak IQ phase 2523 so as to correspond to the number of the present unit term.

$$\theta = \tan^{-1}(PSumI(-)/PSumQ(-)) \quad (8)$$

Subsequently, the CPU 21 calculates (step C29) the error "Δf" of the search center frequency in the latest unit term along the following formula (9) using the peak IQ phase "θ(1)" stored in the unit term dependent peak IQ phase 2523 so as to correspond to the number of the latest unit term, and the peak IQ phase "θ(0)" stored so as to correspond to the number of the unit term previous to the latest.

$$\Delta f = (\theta(1) - \theta(0))/180° \times 1000/2t \times 1/2 \quad (9)$$

It should be noted that "t" denotes the length (msec) of the unit term.

Then, the CPU 21 corrects the search center frequency 2524 stored in the capturing object satellite dependent data 252 of the present capturing object satellite taking the error "Δf" calculated in the step C29 into consideration, and then stores (step C31) the search center frequency 2524.

Subsequently, the CPU 21 looks up the unit term dependent I and Q accumulated correlation value data 2522 to determine whether or not the I and Q accumulated correlation value data corresponding to ten consecutive unit terms is stored (step C33). Then, if it is determined that it is not stored (No in the step C33), the CPU 21 terminates the search center frequency correction process. Further, if it is determined that it is stored (Yes in the step C33), the CPU 21 executes (step C35) the incoherent process of the I and Q accumulated correlation value data corresponding to the ten consecutive unit terms.

Subsequently, the CPU 21 deletes (step C37) the I and Q accumulated correlation value data corresponding to the ten consecutive unit terms from the unit term dependent I and Q accumulated correlation value data 2522. Then, the CPU 21 determines (step C39) the peak frequencies 2525 based on the result of the incoherent process, and stores them into the capturing object satellite data 252 of the present capturing object satellite. Specifically, the CPU 21 determines the peak values of the I and Q accumulated correlation values obtained by the incoherent process, and determines the frequencies of the replica code generation signals corresponding to the peak values as the peak frequencies 2525.

Subsequently, the CPU 21 determines (step C41) whether or not an absolute value of the difference between the search center frequency 2524 having been corrected in the step C31 and the peak frequency 2525 determined in the step C39 exceeds a predetermined threshold value, and if it is determined that the absolute value is equal to or smaller than the threshold value (No in the step C41), the CPU 21 terminates the search center frequency correction process. Further, if it is determined that the absolute value exceeds the threshold value (Yes in the step C41), the CPU 21 corrects (step C43) the search center frequency 2524 into the peak frequency 2525.

It is arranged that if the search center frequency having been corrected using the frequency error "Δf" is significantly different from the peak frequency obtained by executing the incoherent process of the accumulated correlation values, the peak frequency is set as the search center frequency on the faith of the peak frequency. Subsequently, the CPU 21 terminates the search center frequency correction process.

Going back to the positioning process shown in FIG. 6, after executing the satellite capturing process, the CPU 21 makes the process proceed to the next capturing object satellite. Then, after executing the process of the steps A5 through A11 for all of the capturing object satellites, the CPU 21 terminates (step A13) the process of the loop A.

After terminating the process of the loop A, the CPU 21 performs positioning by executing a predetermined positioning calculation using the code phases 2526 stored in the capturing object satellite dependent data 252 with respect to each of the capturing object satellites, and accumulates (step A15) the positioning locations in the candidate location database 253 of the RAM 25 as the candidate locations. As the positioning calculation, a method known to the public such as positioning calculation using a least-squares method or positioning calculation using a Kalman filter can be applied.

Subsequently, the CPU 21 determines (step A17) whether or not the output timing of the output location has been reached. In the present embodiment, the output timing is reached every one second. Then, if it is determined that the output timing has not been reached (No in the step A17), the process returns to the step A1. Further, if it is determined that the output timing has been reached (Yes in the step A17), the CPU 21 determines (step A19) the output location out of the candidate locations accumulated in the candidate location database 253 of the RAM 25.

The output location can be determined based on, for example, the signal intensity of the capturing object satellite used for obtaining the candidate locations, and the position dilution of precision (PDOP) value as the index value of the sky arrangement. For example, the CPU 21 determines the candidate location with the maximum average value of the signal intensity of the GPS satellite signals of all of the capturing object satellites or the candidate location with the minimum PDOP value to determine it as the output location.

Subsequently, the CPU 21 outputs (step A21) the output location, which is determined in the step A19, to the host CPU 30. Then, the CPU 21 deletes (step A23) the candidate locations stored in the candidate location database 253. Subsequently, the CPU 21 determines (step A25) whether or not the user provides the positioning termination instruction to the operation section 50, and if it is determined that no such instruction has been provided (No in the step A25), the process returns to the step A1. Further, if it is determined that the positioning termination instruction has been provided (Yes in the step A25), the CPU 21 terminates the positioning process.

4. Experimental Results

Figure 10:
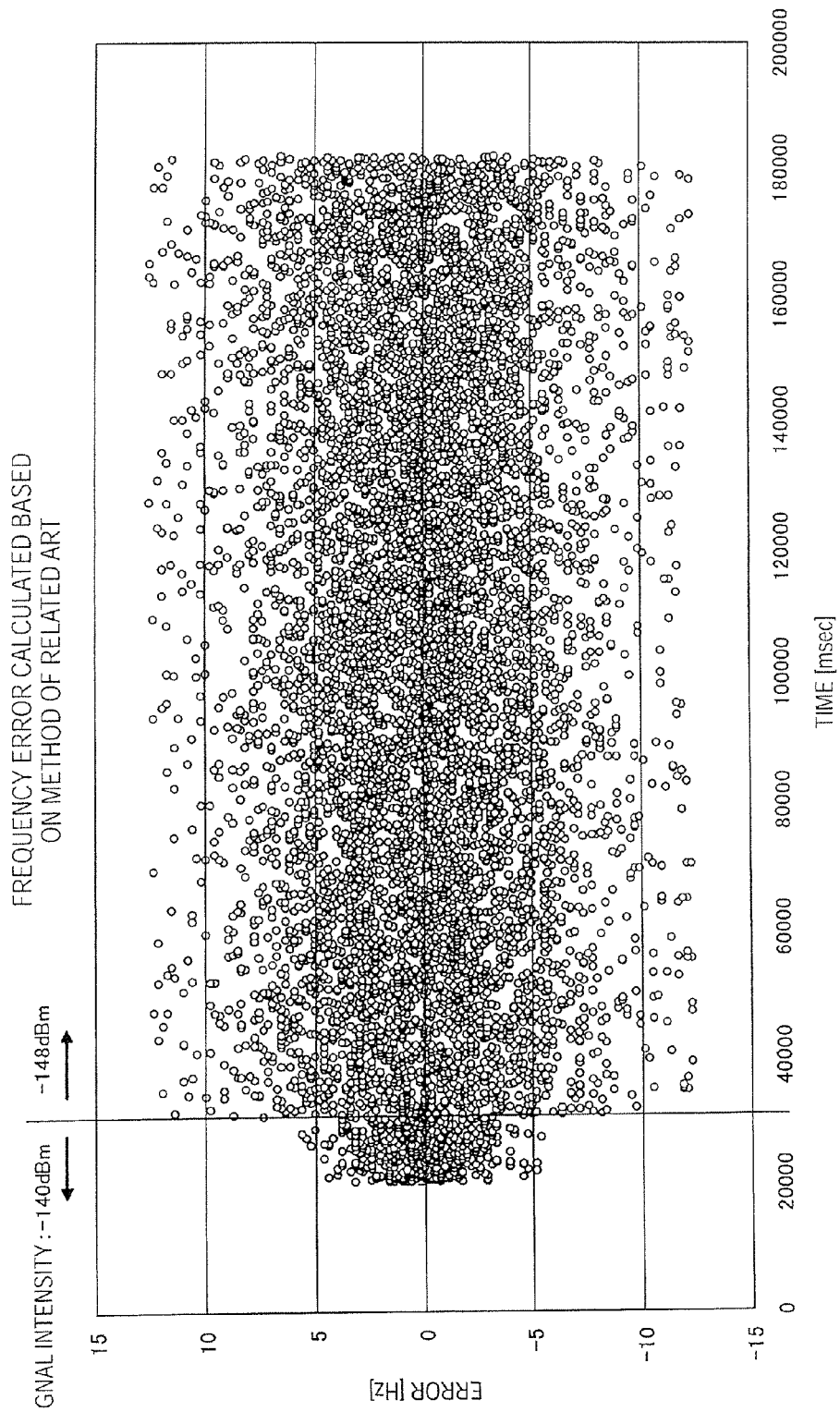
FIG. 10 is a diagram showing an example of a result of an experiment based on the method of the related art.
Figure 11:
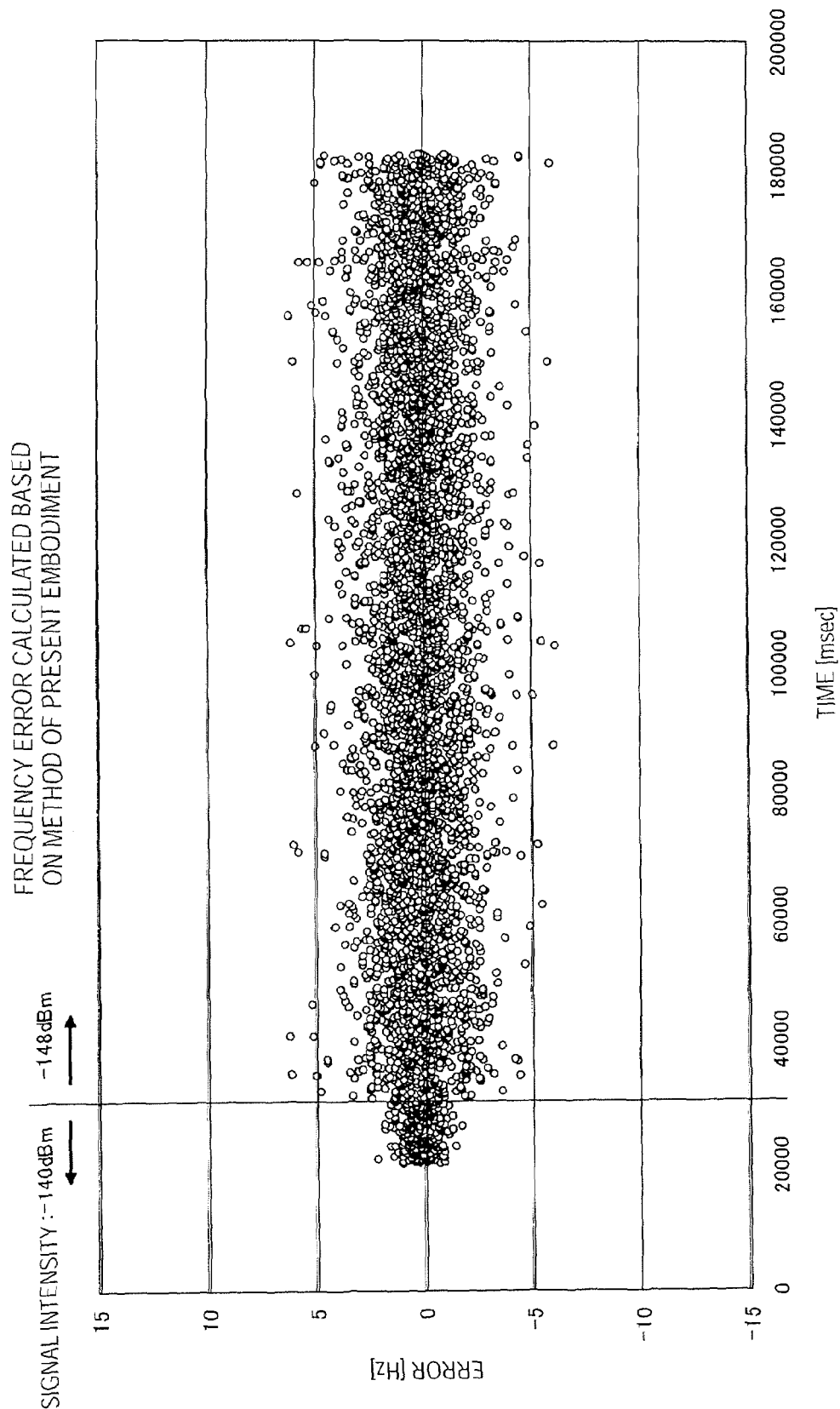
FIG. 11 is a diagram showing an example of a result of an experiment based on the method of the present embodiment.

FIG. 10 is a graph with the errors "Δf" of the search center frequency, which are calculated based on the method of the related art, plotted thereon, and FIG. 11 is a graph with the errors "Δf" of the search center frequency, which are calculated based on the method of the present embodiment, plotted thereon. In each of the drawings, the horizontal axis represents time (msec), and the vertical axis represents the magnitude of the errors (Hz) in the search center frequency.

It is understood that in the method of the present embodiment, the errors become generally small, and the variation of the errors is small in comparison with the method of the related art. Further, in the environment (an intense electric field environment) in which the signal intensity of the received GPS satellite signal is "−140 dBm," the magnitude of the frequency error takes the value as extremely small as about "no greater than +2 Hz," and even in the environment (a weak electric field environment) in which the signal intensity of the received GPS satellite signal is "−148 dBm," the magnitude of the frequency error takes the value as small as about "no greater than ±5 Hz." According to the fact described above, it is understood that according to the method of the present embodiment, the search center frequency can be obtained with high accuracy in either of the intense electric field environment and the weak electric field environment.

5. Functions and Advantages

According to the present embodiment, the correlation calculation between the received signal of the GPS satellite signal modulated by the direct sequence spread spectrum method using the PRN code and the replica code of the PRN code is executed within a predetermined frequency search range for each of the I and Q components. Further, the I and Q correlation values obtained by the correlation calculation are accumulated in every unit term as the interval of the polarity inversion, thereby calculating the I and Q accumulated correlation values, and then the I and Q accumulated correlation values corresponding to two unit terms are respectively added and subtracted in the combinations with signs different from each other. Then, one of the combinations is selected based on the result of the addition and subtraction of each of the combinations, and the search center frequency is corrected based on the time variation of the IQ phase (the peak IQ phase) of the peak values of the accumulated correlation values of the selected combination.

More specifically, assuming that the I and Q accumulated correlation values in the latest unit term are respectively "SumI(1)" and "SumQ(1)," and the I and Q accumulated correlation values in the unit term previous to the latest are respectively "SumI(0)" and "SumQ(0)," "SumI(+)" as the additional value of the "SumI(0)" and "SumI(1)" and "SumQ (+)" as the additional value of the "SumQ(0)" and "SumQ(1)" are calculated. Further, "SumI(−)" as the subtraction value of the "SumI(0)" and "SumI(1)" and "SumQ(−)" as the subtraction value of the "SumQ(0)" and "SumQ(1)" are calculated.

Then, the peak value of the "Sum(+)" represented by the sum of the absolute value of the "SumI (+)" and the absolute value of the "SumQ(+)" and the peak value of the "Sum(−)" represented by the sum of the absolute value of the "SumI (−)" and the absolute value of the "SumQ(−)" are compared, and if the peak value of the "Sum(+)" is equal to or greater than the peak value of the "Sum(−)," the combination of the "SumI (+)" and the "SumQ(+)" is selected. On the other hand, if the peak value of the "Sum(+)" is smaller than the peak value of the "Sum(−)," the combination of the "SumI(−)" and the "SumQ(−)" is selected. Then, the peak IQ phase "θ" is calculated using the peak values of the accumulated correlation values of the selected combination, the error "Δf" of the search center frequency is calculated using the peak IQ phase "θ1" obtained with respect to the latest unit term and the peak IQ phase "θ0" obtained with respect to the unit term previous to the latest, and the search center frequency is corrected using the error "Δf."

The polarity of the PRN code of the GPS satellite signal has a possibility of being inverted at each interval of the polarity inversion in association with the polarity inversion of the bit of the navigation data. Therefore, when calculating the plurality of accumulated correlation values obtained at each polarity inversion, the accumulated correlation values are added and subtracted in combination of different signs, and the combination with small setoff of the accumulated correlation values due to the polarity inversion of the PRN code is selected. By correcting the search center frequency based on the time variation of the peak IQ phase of the accumulated correlation value of the combination thus selected, it becomes possible to obtain the search center frequency with high accuracy.

Further, since in the present embodiment, it is arranged that the correction process of the search center frequency is executed for every capturing object satellite, it is possible to set an appropriate search center frequency individually to each of the capturing object satellites, thereby performing capturing of the satellites.

6. Modified Examples 6-1. Receiving Apparatus

The receiving apparatus to which the invention can be applied is not limited to the positioning apparatus receiving the positioning signal described above, but the invention can also be applied to any receiving apparatus which receives a signal modulated by the direct sequence spread spectrum method. For example, a receiving apparatus of a communication signal of a portable phone using the Code Division Multiple Access (CDMA) method, or a receiving apparatus of a communication signal of a wireless local area network can also be adopted.

6-2. Electronic Equipment

The invention can be applied to any electronic equipment providing the electronic equipment is provided with the receiving apparatus. For example, the invention can be applied to a laptop personal computer, a personal digital assistant (PDA), a vehicle navigation apparatus, and so on in a similar manner.

6-3. Satellite Positioning System

In the embodiment described above, although the explanations are presented exemplifying the GPS as the satellite positioning system, other satellite positioning systems such as Wide Area Augmentation System (WAAS), Quasi Zenith Satellite System (QZSS), GLObal NAvigation Satellite System (GLONASS), or GALILEO can also be adopted.

6-4. Split of Processing

It is possible to arrange that the host CPU 30 executes a part or the whole of the process to be executed by the CPU 21. For example, it is possible to arrange that the host CPU 30 executes the search center frequency correction process, and the CPU 21 executes the satellite capturing process based on the processing result. Alternatively, it is also possible to arrange that the host CPU 30 executes the all processes, of which the CPU 21 is in charge, including the satellite capturing process.

6-5. Correlation Calculation Section

Although in the embodiment described above the explanations are presented assuming that the CPU 21 realizes the correlation process and the correlation accumulation process with software, it is also possible to separately provide a correlation calculation section as a circuit section for executing the correlation calculation and the accumulation of the correlation values to the baseband processing circuit section 20, thereby realizing the processes with hardware. In this case, the correlation calculation section is arranged to execute the correlation calculation between the received signal and the replica code within the frequency search range determined by the CPU 21.

6-6. Incoherent Processing Term

In the embodiment described above, the explanations are presented assuming that the incoherent process of the accumulated correlation values corresponding to ten consecutive unit terms is executed, and the search center frequency is corrected based on the processing result. However, the ten unit terms are nothing more than an example, and it is also possible to execute the incoherent process of the accumulated correlation values corresponding to, for example, 50 unit terms or 100 unit terms to correct the search center frequency, and in other words, it is possible to appropriately set the incoherent processing term.

6-7. Correction of Search Center Frequency

Although in the embodiment described above the explanations are presented assuming that if the absolute value of the difference between the search center frequency and the peak frequency exceeds a predetermined threshold value, the search center frequency is corrected into the peak frequency, it is also possible to calculate, for example, an average frequency of the peak frequency and the search center frequency, and correct the search center frequency into the average frequency.

6-8. Output Timing

Although in the embodiment described above the explanations are presented assuming that the output timing of the output locations occurs every one second, it is possible that the interval (e.g., every 500 milliseconds) shorter than one second and the interval (e.g., every 5 seconds) longer than one second can also be adopted.

What is claimed is:

1. A search frequency correction method comprising:
   (a) obtaining correlation values by correlating a received signal that is modulated with direct sequence spread spectrum modulation and a replica code of a spread code for each of I and Q components within a frequency search range including a search center frequency;
   (b) obtaining accumulated correlation values by accumulating the correlation values for each of the I component and the Q component for a time period corresponding to a polarity inversion interval;
   (c) obtaining long-term accumulated values for each of the I component and the Q component using the accumulated correlation values for a time period longer than the polarity inversion interval;
   (d) determining an error of the search center frequency based on the long-term accumulated values; and
   (e) correcting the search center frequency using the error, wherein
   the obtaining the long-term accumulated values includes calculating I addition of the accumulated correlation values for the I component, I subtraction of the accumulated correlation values for the I component, Q addition of the accumulated correlation values for the Q component and Q subtraction of the accumulated correlation values for the Q component, and
   the determining the error includes
      selecting a first combination of the calculated I addition and the calculated Q addition or a second combination of the calculated I subtraction and the calculated Q subtraction based on the calculated I addition, I subtraction, Q addition and Q subtraction, and
      determining the error based on the selected combination.

2. The method according to claim 1, wherein
the selecting the first combination or the second combination includes selecting the first combination or the second combination based on a first addition of a magnitude of the I addition and a magnitude of the Q addition and a second addition of a magnitude of the I subtraction and a magnitude of the Q subtraction.

3. The method according to claim 1, further comprising:
executing an incoherent process using the accumulated correlation values for a time period longer than the polarity inversion interval;
setting a peak frequency obtained by the incoherent process to the search center frequency when the corrected search center frequency and the peak frequency fail to satisfy a predetermined approximation condition.

4. A positioning method comprising:
executing the search frequency correction method according to claim 1 using the received signal; and
positioning by executing a predetermined positioning calculation using the accumulated correlation values.

5. A receiving apparatus comprising:
a correlation calculation section adapted to obtain correlation values by correlating a received signal that is modulated with direct sequence spread spectrum modulation and a replica code of a spread code for each of I component and Q component within a frequency search range including a search center frequency;
an accumulation section adapted to obtain accumulated correlation values by accumulating the correlation values for each of the I component and the Q component for a time period corresponding to a polarity inversion interval;
a calculation section adapted to obtain long-term accumulated values for each of the I component and the Q component using the accumulated correlation values for a time period longer than the polarity inversion interval;
a determining section adapted to determine an error of the search center frequency based on the long-term accumulated values; and
a correction section adapted to correct the search center frequency using the error,
wherein
the obtaining the long-term accumulated values includes calculating I addition of the accumulated correlation values for the I component, I subtraction of the accumulated correlation values for the I component, Q addition of the accumulated correlation values for the Q component and Q subtraction of the accumulated correlation values for the Q component, and
the determining the error includes
   selecting a first combination of the calculated I addition and the calculated Q addition or a second combination of the calculated I subtraction and the calculated Q subtraction based on the calculated I addition, I subtraction, Q addition and Q subtraction, and
   determining the error based on the selected combination.

* * * * *